Figure 1:
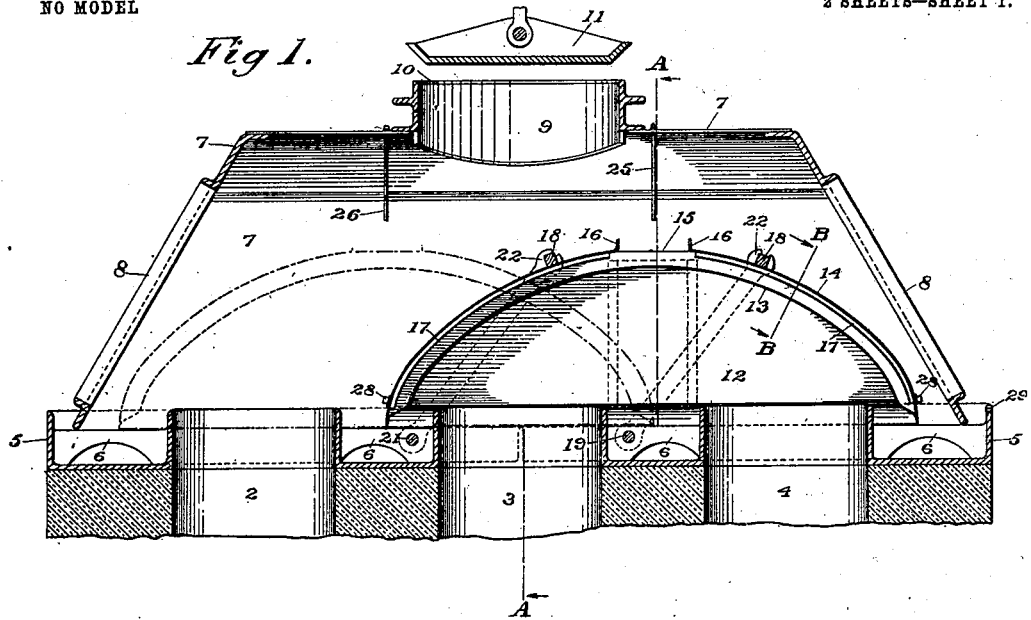

No. 730,708. PATENTED JUNE 9, 1903.
J. W. SEIGH.
REVERSING VALVE FOR FURNACES.
APPLICATION FILED AUG. 8, 1902.
NO MODEL. 2 SHEETS—SHEET 1.

WITNESSES,
J. R. Wemlinger.
Stone Edelen

INVENTOR
John W. Seigh
by Geo. E. Thackray
his ATTORNEY

THE NORRIS PETERS CO., PHOTO-LITHO., WASHINGTON, D. C.

No. 730,708. PATENTED JUNE 9, 1903.
J. W. SEIGH.
REVERSING VALVE FOR FURNACES.
APPLICATION FILED AUG. 8, 1902.
NO MODEL. 2 SHEETS—SHEET 2.
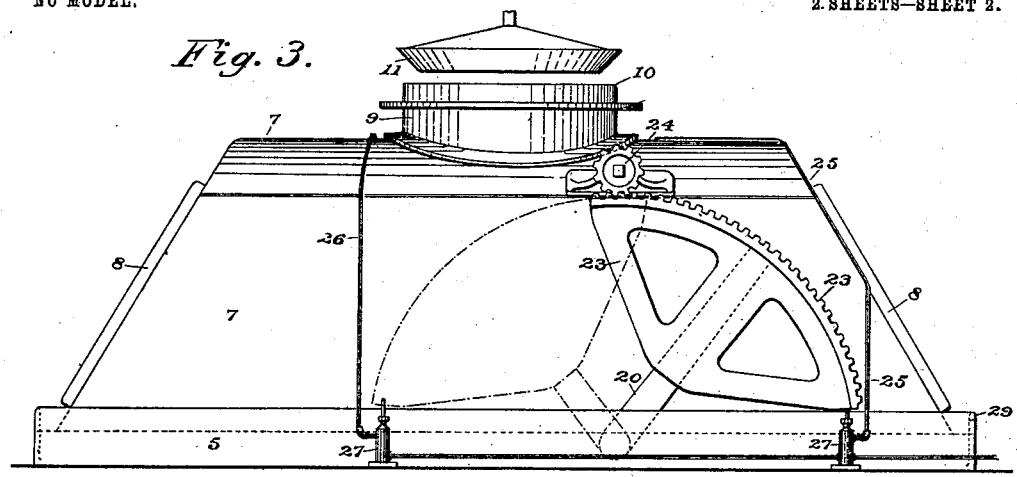
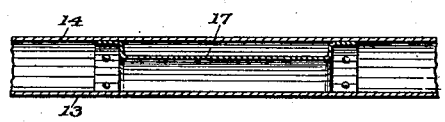
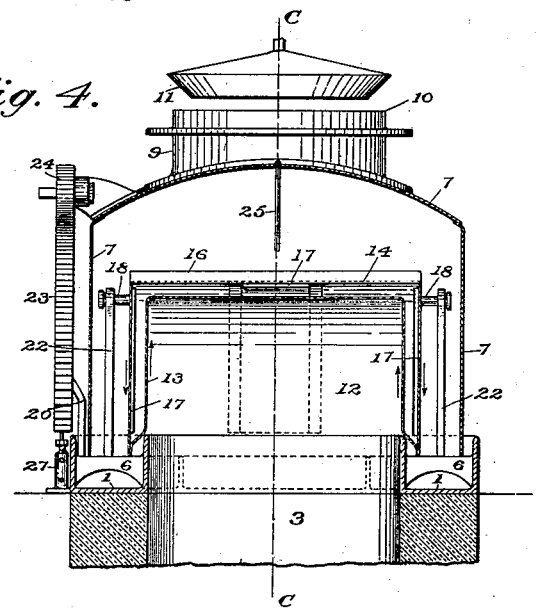
WITNESSES,
J. R. Wemlinger.
Stone Edelen
INVENTOR.
John W. Seigh
by Geo. E. Thackray
his ATTORNEY.

No. 730,708.

Patented June 9, 1903.

UNITED STATES PATENT OFFICE.

JOHN W. SEIGH, OF JOHNSTOWN, PENNSYLVANIA.

REVERSING-VALVE FOR FURNACES.

SPECIFICATION forming part of Letters Patent No. 730,708, dated June 9, 1903.

Application filed August 8, 1902. Serial No. 118,902. (No model.)

*To all whom it may concern:*

Be it known that I, JOHN W. SEIGH, a citizen of the United States, residing at Johnstown, in the county of Cambria and State of Pennsylvania, have invented certain new and useful Improvements in Reversing-Valves for Furnaces; and I do hereby declare the following to be a full, clear, and exact description of the invention, such as will enable others skilled in the art to which it appertains to make and use the same.

My invention relates to improvements in reversing-valves such as are used in regenerative steel-melting furnaces or heating-furnaces for directing the currents of air or gas alternately to one side or the other of the furnace, while at the same time controlling the flow of the products of combustion to the stack.

Certain of the objects of my invention are to provide a valve which is water-sealed and water-cooled, thus preventing any warping or distortion of said valve by the heat to which it is subjected, thereby maintaining it in shape to close tightly in its seats at all times, in this manner preventing wasteful and destructive leakage of the air and gases controlled by said valve, in addition to which the water cooling maintains and prolongs the life of the construction, consequently conducing to economy and good service.

A further purpose of my invention is to provide means which will produce a continuous circulation of water within the valve-shell and otherwise increase its efficiency.

My improved valve may be of elliptical or approximately semicircular longitudinal cross-section with vertical sides and is constructed of two parallel and concentric shells, with an intervening water-space meeting at their lower edges and preferably made of steel plates carefully calked at all joints, so as to make the valve thoroughly water-tight. To allow for the inflow and outflow of water, I provide a rectangular opening in the top shell of the valve and also provide blow-off cocks at the lower part of my valve, so that any mud or similar deposits that may accumulate within the valve can be washed out when desired. The cooling-water is supplied through either one of two small pipes projecting through the surrounding casing in such a way that one or the other of said pipes is always directly above the rectangular opening above referred to when the valve is in either one of its working positions, the flow of water being controlled automatically, as hereinafter described.

On account of the fact that the hotter outgoing gases or products of combustion are in contact with the interior of the valve it will be readily understood that the inner shell of the valve is generally hotter than the outer shell of same, which consequently tends to cause an upward current of water along said inner shell and a downward current along the cooler outer shell. I assist and improve this circulation of water by the introduction of circulating-conduits extending from the opening in the top shell of the valve to points near the lower edges of the valve, which conduits consist, preferably, of channeled plates having horizontal flanges riveted to the inner sides of the outer valve-shell, so as to form rectangular passages open at both ends. By reason of this construction the incoming cold water will tend to flow through said conduits down to the bottom of the valve, there displacing the warmer water, which flows upward and over the sides of the valve, at the central part thereof.

To prevent the outgoing water from flowing over the top and ends of the valve and dripping into the ports when the valve is shifted, I provide upwardly-projecting flanges on each side of the rectangular opening aforesaid. Thus the outflow of water takes place only at the ends of said rectangular opening and over the sides of the valve, thence collects in the water-channels of the bed-plate to effectually seal the valve and its casing.

My improved valve is provided with a casing which may be of the general or usual type of such constructions, made of steel plate or cast-iron, which may be lined with firebrick, if necessary, and provided with the usual mushroom-valve and cleaning-doors.

The operative connections consist of a toothed sector attached to the operating-lever and geared to a small pinion supported by the casing and revolved by means of any suitable arrangement. Said toothed sector is proportioned so that when the valve is in either extreme position the water is supplied

to the said valve automatically by one edge of said sector striking a small spring-valve located in the water-supply pipe.

Having thus given a general description of my invention and its advantages, I will now in order to make the matter more clear refer to the annexed two sheets of drawings, which form part of this specification and in which like figures refer to like parts.

Figure 2:
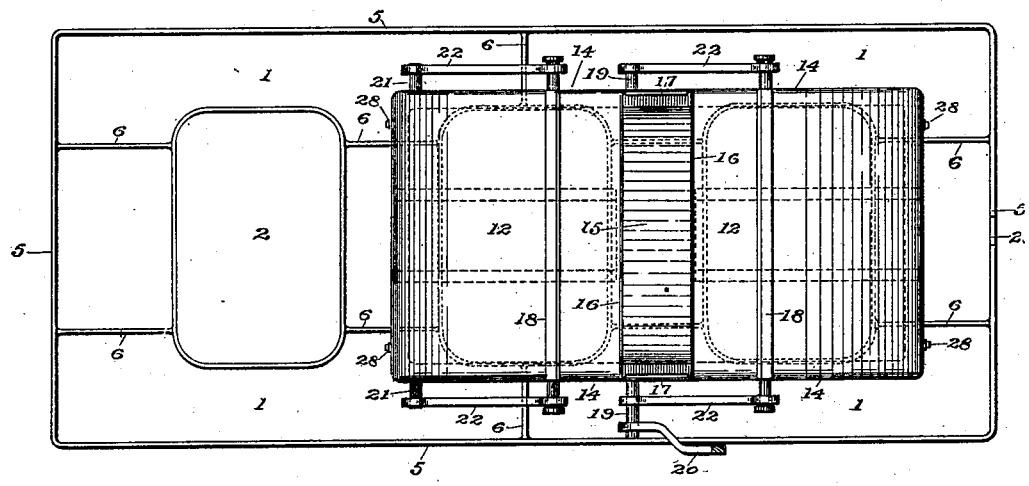

Figure 1 is a longitudinal central vertical sectional elevation of the complete valve on line C C of Fig. 4. Fig. 2 is a top plan of the valve and bed-plate with the casing removed for clearness of illustration. Fig. 3 is a side elevation of the valve-casing, showing the operative connections. Fig. 4 is a transverse vertical sectional elevation of the complete valve on line A A of Fig. 1. Fig. 5 is a section through the valve-shells on line B B of Fig. 1.

Referring now to the several characters of reference upon the drawings, 1 is a bed-plate provided with openings registering with the ports or flues 2, 3, and 4.

2 is the usual port or flue leading to one end of the furnace, 4 is a similar port or flue leading to the other end of the furnace, and 3 is a flue connecting with the chimney or stack.

The bed-plate 1 is provided with a surrounding flanged edge 5.

6 represents longitudinal and transverse reinforcing-ribs of less height than the flanged edge 5, said ribs being all submerged when the bed-plate 1 is filled with water. Resting upon the outer ribs 6 is the valve-casing 7, preferably made of steel plate or cast-iron, which may be lined with brick, provided at each end with cleaning-doors 8 and at the top with the gas or air connection 9, having the seat 10 for the usual mushroom inlet-valve 11.

12 represents my improved valve, constructed of two parallel and concentric shells 13 and 14, preferably made of steel plates, with intervening water-space meeting in an edge at the base of the valve, as shown.

15 is a rectangular opening in the shell 14 at the top of the valve for the inflow and outflow of the cooling-water. 16 represents upwardly-projecting flanges adjoining the sides of said opening, which prevent the water from flowing over the top and ends of the valve, but allow it to flow out of the ends of the opening and down the perpendicular sides of said valve. The outflowing water thus collects in the channels of the bed-plate and serves to water-seal the valve itself, as well as the casing. The water in the channels of the bed-plate is maintained at a constant level by and overflows through the opening 29, which may be connected with any suitable waste-pipe or sewer.

17 represents circulating-conduits, preferably formed of channeled steel plate riveted to the inner side of the shell 14, which conduits extend downwardly from the sides and ends of the opening 15 to points near the bottom of the valve, said conduits being open at both ends, as shown. Although I can construct, operate, and water-cool my valve without these conduits 17, as may be readily understood, I have shown them as an attached feature of my invention, as they are intended to promote the circulation of water within the valve in the manner hereinbefore stated.

Referring to Fig. 4, the arrows thereon adjoining the side sheets of my improved valve indicate the directions of the flow of the water within the valve-shell, which, as explained above, may be assisted by the construction of the conduits 17 in case these are used, although, as heretofore stated, the valve may be made and cooled without them.

18 represents square shafts fastened to and across the top valve-shell 14 and projecting over the sides of the valve to form journals, as shown.

19 and 21 are rocker-shafts, both mounted in suitable bearings provided in the bed-plate. Keyed to shafts 19 and 21 and on each side of the valve are the links 22, which are slotted at their upper extremities to receive the end journals of shafts 18, and 20 is an operating-lever connected to shaft 19.

23 is a toothed sector secured to the operating-lever 20 and geared to the pinion 24, as illustrated in Fig. 3.

25 and 26 are the water-supply pipes, and 27 represents self-closing spring-valves which are opened by the pressure of the sector 23, as before mentioned, and 28 represents the wash-out plugs for draining and cleaning out the interior of the main valve 12.

The operation of my improved reversing-valve is apparent and as follows: As the pinion 24 is revolved clockwise the sector 23 and the connected operating-lever 20 are moved to the position shown by dotted lines in Fig. 3, thereby moving the valve laterally to the position similarly indicated in dotted lines in Fig. 1, dropping it into the water seal and reversing the flow of gas or air, as the case may be, to and through the furnaces. When the sector nearly reaches the aforesaid position, it strikes the vertical stem of the spring-valve 27 and the water flows at once through pipe 26 and drops into the valve through the opening 15. In a similar manner the reversing-valve can be returned to its original position and in each case as the sector 23 begins to move the stem of the spring-valve 27 is released, thus stopping all further flow of water before the reversing-valve has made any appreciable lateral movement.

It will be readily understood that with my improved water-cooled reversing-valve I can overcome the defects of the customary uncooled valves made of cast-iron or steel plates, which are sometimes lined with brick, in which latter case the unequal expansion of the lining and the valve-shell causes the former to separate and drop off, while the latter warps badly and allows the air, gases, or products of combustion to escape through cracks and fissures, causing loss and destruction.

In the descriptions of my improved apparatus I refer to a reversing-valve for furnaces which is usually considered as a whole, including both the moving part or valve proper, the operating mechanism therefor, and the outer casing thereof, and in order to prevent confusion of terms I wish it understood that when I speak of "reversing-valve" I mean the entire apparatus and when I speak of the "valve" I refer to the moving part formed of two concentric shells, which together are designated as 12 on the drawings.

Although I have shown my improvements in considerable detail, I do not limit myself to the exact and specific particulars of the arrangements shown and described, but may use such substitutions, modifications, or equivalents thereof as are embraced within the scope of my invention and as pointed out in the claims.

Having thus given a description of my invention, what I claim, and desire to secure by Letters Patent, is—

1. In a reversing-valve, a water-cooled valve formed of two parallel and concentric shells of substantially D shape in longitudinal vertical section and approximately rectangular in transverse vertical section, said shells being secured directly together at their bases, the upper one of said shells having an opening therein extending entirely across the top thereof, provided for the passage of cooling-water and means for directing the overflow of water therefrom to the sides of the valve and preventing the flow of same over the ends thereof.

2. In a reversing-valve, a water-cooled valve formed of two parallel and concentric shells joined together at their bases, an opening extending across the top of the upper shell, upwardly-projecting flanges secured to the upper shell adjoining the sides of the opening aforesaid, said flanges being adapted to guide the discharge of water toward the sides of, and to prevent the same from flowing over, the ends of the valve aforesaid.

3. In a reversing-valve, a water-cooled valve formed of two parallel and concentric shells joined together at their bases, an opening in and extending across the top of the upper shell, upwardly-projecting flanges secured to said upper shell adjoining the sides of the opening aforesaid, circulating-conduits arranged within and between said shells and extending from said opening to points near the bottoms of said shells.

4. In a reversing-valve, a water-cooled valve formed of two parallel and concentric shells joined together at their bases, an opening extending across the top of the upper shell, upwardly-projecting flanges secured to the upper shell adjoining the sides of the opening aforesaid, circulating-conduits consisting of channeled plates secured to the outer shell within the water-space of said valve and extending from the opening aforesaid to points near the bottoms of said shells, each of said conduits forming a continuous passage open at both ends.

5. In a reversing-valve, a water-cooled valve formed of two parallel and concentric shells joined together at their bases, the upper one of which is provided with a rectangular opening extending across the top thereof and provided with side flanges, circulating-conduits consisting of channeled plates secured to the outer shell within the water-space between said shells and extending from said top opening to points near the bottom of said water-space, each of said conduits forming a passage of substantially rectangular cross-section open at both ends.

6. In a reversing-valve, a water-cooled valve formed of two parallel and concentric shells joined together at their bases, a rectangular opening extending across the top of the upper shell, circulating-conduits of substantially rectangular cross-section consisting of channeled plates secured to the outer shell within the water-space of the valve aforesaid, said conduits extending from the top opening to points near the bottom of said water-space, means for oscillating said valve and for automatically supplying cooling-water thereto.

7. In a reversing-valve, a water-cooled valve formed of two parallel and concentric shells joined together at their bases, an opening extending across the top of the upper shell, upwardly-projecting flanges secured to the upper shell adjoining the sides of the opening aforesaid, journals secured to the upper portions of said valve, links mounted on rocker-shafts supporting said journals and means for oscillating said shafts thereby shifting said valve.

8. In a reversing-valve, a water-cooled valve formed of two parallel and concentric shells joined together at their bases, an opening extending across the top of the upper shell, means for oscillating said valve, water-supply pipes located over the said opening when the valve is in its two extreme positions, spring water-valves located in the branches of said water-pipes, and means for actuating said water-valves by the movement of the oscillating mechanism of said water-cooled valve.

In testimony whereof I hereto affix my signature in the presence of two witnesses.

JOHN W. SEIGH.

Witnesses:
J. R. WEMLINGER,
STONE EDELEN.

It is hereby certified that Letters Patent No. 730,708, granted June 9, 1903, upon the application of John W. Seigh, of Johnstown, Pennsylvania, for an improvement in "Reversing Valves for Furnaces," an error appears in the printed specification requiring the following correction, viz: In line 40, page 1, a comma should be inserted after the word "water-space"; and that the said Letters Patent should be read with this correction therein that the same may conform to the record of the case in the Patent Office.

Signed and sealed this 7th day of July, A. D., 1903.

[SEAL.]

E. B. MOORE,
*Acting Commissioner of Patents.*